P. J. BREWINGTON.
ANIMAL TRAP.
APPLICATION FILED MAY 14, 1920.

1,373,594.

Patented Apr. 5, 1921.

Philip J. Brewington, INVENTOR.

BY Richard B. Owen, ATTORNEY.

UNITED STATES PATENT OFFICE.

PHILIP JENNINGS BREWINGTON, OF TEMPLE, TEXAS.

ANIMAL-TRAP.

1,373,594.   Specification of Letters Patent.   Patented Apr. 5, 1921.

Application filed May 14, 1920. Serial No. 381,392.

*To all whom it may concern:*

Be it known that I, PHILIP J. BREWINGTON, a citizen of the United States, residing at Temple, in the county of Bell and State of Texas, have invented certain new and useful Improvements in Animal-Traps, of which the following is a specification.

This invention relates to an animal trap and has for its principal object the production of a device of this character which will be sprung by the animal when he touches the bait and is constructed in such a manner that he will be instantly killed.

Another object of the invention is to produce a strong and durable trap which will be reliable and certain in action, and which is composed of metal parts of such construction as to enable the trap to be manufactured at small expense.

With these and numerous other objects in view, the invention resides in certain novel features of construction and the combination and arrangement of parts as will be hereinafter more fully described and claimed.

In the drawing:—

Figure 1:
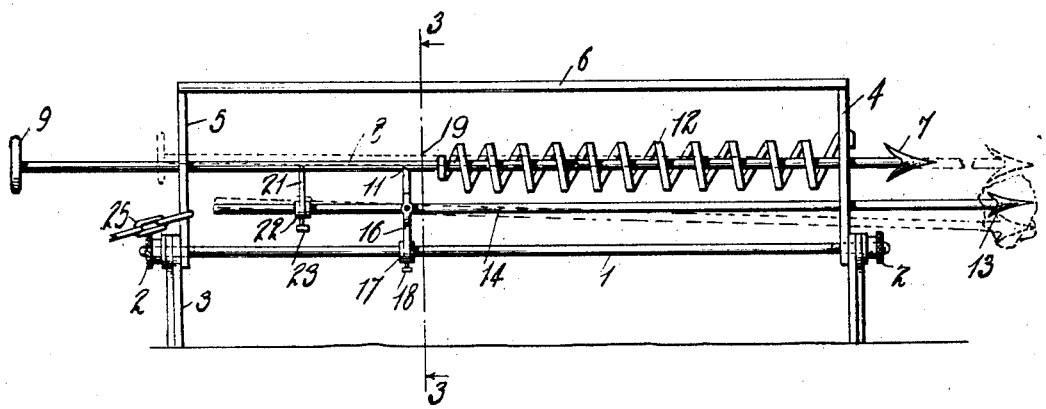
Figure 1 is a side elevation of the trap.
Figure 3:
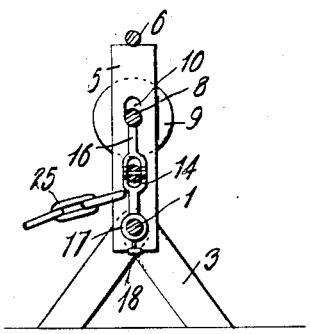
Fig. 3 is a section taken on the line 3—3 of Fig. 1.
Figure 2:
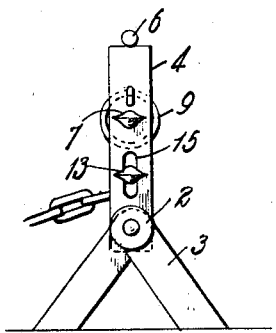
Fig. 2 is a front elevation of the trap.
Figure 5:
Fig. 5 is an enlarged elevational view of the arm 21.

Referring to the drawings by numerals it will be seen that 1 designates a lower bar which is threaded at each end for receiving the nuts 2 for holding the foldable legs 3 in the proper position, these legs 3 resembling an inverted V in an operative position. A pair of upright standards 4 and 5 are carried on the bar 1. The forward standard 4 is connected to the rear standard 5 by means of the upper bar 6.

Figure 4:
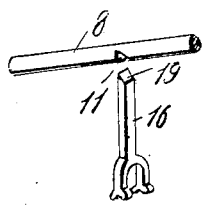
Fig. 4 is a detailed perspective view showing portions of the tripping mechanism.

A spear 7 having the elongated shank 8 having the knob 9 upon its extremity extends through an aperture in the forward standard 4 and through a slot 10 in the rear standard 5. By referring to Fig. 4 of the drawing it will be seen that the shank 8 is provided intermediate its ends with a notch 11 which is adapted to be engaged by a trigger to be hereinafter described. A compression coil spring 12 having one end fixed to the forward standard 4 and its other end fixed to the shank 8 as shown in Fig. 1 of the drawing is disposed so as to encircle the shank 8 and to normally force the spear forwardly as shown by dotted lines in Fig. 1.

Disposed below the spear 7 is the bait carrying spear 13 having an elongated shank 14 which passes through the slot 15 provided in the forward standard 4 below the opening through which the shank 8 passes. This shank 14 terminates a short distance forwardly of the rear standard 5 as shown in Fig. 1 and is supported by means of the trigger 16. This trigger 16 is provided with a collar 17 at its lower end which encircles the bar 1 and is held in place by means of a set screw 18. Intermediate the ends of the trigger 16 there is provided a slot through which the shank 14 passes and in which it is pivotally carried by means of a pin. Above this slot the trigger has its upper end terminating in a sharp portion 19 for engaging the notch 11 upon the shank 8. Disposed toward the rear end of the shank 14 is the supporting arm 21 having a collar at its bottom end 22 for encircling the shank 14 and a set screw 23 so that this collar may be held tightly thereon. At the upper end of this arm 21 there is provided a yoke so that the shank 8 may rest therein.

The bait is placed upon the spear 13 as indicated in dotted lines in Fig. 1 and the shank 8 is pulled backwardly until the notch 11 engages the point 19 of the trigger 16 at which time the trap is in a set position. When the victim attempts to remove the bait from the spear 13 he will naturally pull the same downwardly thus causing the shank 14 to pivot upon the trigger 16 whereby the arm 21 will lift the shank 8 so that the notch 11 will be released from the point 19 of the trigger 16 thus allowing the compression spring 12 to force the spear forwardly at considerable speed so as to hit the victim in his head thus crushing his skull so that he will be immediately killed with very little pain. In order that the trap may not be carried away by unauthorized persons I have provided a chain 25 which is attached to the rear standard 5 and may be locked to any stationary object. It will be seen that this trap may be constructed of any desirable size so as to be used for catching various animals and that the same is constructed so that all the parts are easily accessible so that they may be readily kept clean as is very desirable in devices of this nature.

From the foregoing description taken in connection with the accompanying drawing, the construction and operation of the device will be readily understood without a more extended explanation. As numerous changes in form, proportion, and in the minor details of construction, may be resorted to without departing from the spirit of this invention, I do not wish to be limited to the construction herein shown and described other than as claimed.

Having thus described my invention what I claim as new is:—

1. A device of the class described comprising a frame, a bait rod pivotally carried by said frame, a spear rod slidably carried by said frame, means for normally urging said spear rod forwardly, means for connecting said spear rod to said bait rod, and means provided on said bait rod for lifting said spear rod so as to release same.

2. A device of the class described comprising a frame, a bait rod pivotally carried by said frame, a spear rod slidably mounted in said frame, a compression coil spring having one end connected to said frame and the other end connected to said spear rod for normally urging the same forwardly, means for connecting said spear rod to said bait rod, and means provided on said bait rod for lifting said spear rod out of engagement with said bait rod.

3. A device of the class described comprising a frame, a bait rod pivotally carried by said frame, a spear rod slidably mounted in said frame, a compression coil spring having one end connected to said frame and the other end connected to said spear rod, means for holding said spear rod in a set position, and an arm having a yoke at its free end carried by said bait rod so that said bait rod may be pivoted for lifting said spear rod in a released position so that the spring may actuate to force said spear rod forwardly.

4. A device of the class described comprising a frame, a spear rod slidably mounted in said frame, a compression coil spring having one end attached to said frame and the other end attached to said spear rod, a bait rod, a trigger having a slot intermediate its ends so as to pivotally carry said bait rod therein, the free end of said trigger adapted to engage said spear rod for holding the same in a set position, and means provided on the rear end of said bait rod for lifting said spear rod out of engagement with said trigger.

5. A device of the class described comprising a frame, a spear rod slidably mounted in said frame, means for normally urging said spear rod forwardly, a bait rod, a trigger mounted on said frame and provided with a slot intermediate its ends for pivotally carrying said bait rod and having its free ends sharpened so as to engage a notch in said spear rod for holding the same in a set position, and an arm provided with a yoke disposed upon the rear end of said bait rod and adapted to engage said spear rod when the bait rod is pivoted so as to raise the spear rod out of engagement with the trigger.

6. In a device of the class described, the combination of a frame composed of an upper bar and a lower bar, standards connecting the ends of said bars, a spear rod slidably mounted in said standards, means for normally urging said spear rod forwardly, a bait rod, a trigger having a collar encircling said lower bar, a set screw provided in said collar for fixing same tightly to said lower bar, said trigger provided with a slot intermediate its ends for pivotally carrying said bait rod, and having its upper end sharpened so as to engage a notch in said spear rod, and means provided on said bait rod for engaging said spear rod so that when said bait rod is pivoted said spear rod will be lifted out of engagement with said trigger.

In testimony whereof I affix my signature in presence of two witnesses.

PHILIP JENNINGS BREWINGTON.

Witnesses:
L. E. POSEY,
J. H. COLEMAN.